US012078985B1

(12) United States Patent
Marudhalam et al.

(10) Patent No.: US 12,078,985 B1
(45) Date of Patent: Sep. 3, 2024

(54) SYSTEM AND METHOD FOR WORK TASK MANAGEMENT USING APPLICATION-LEVEL BLUE-GREEN TOPOLOGY WITH PARALLEL INFRASTRUCTURE RAILS

(71) Applicant: Morgan Stanley Services Group Inc., New York, NY (US)

(72) Inventors: Sree Marudhalam, Princeton, NJ (US); Vishal Deshmukh, Plainsboro, NJ (US); Sujit Eapen, Plainsboro, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/470,070

(22) Filed: Sep. 19, 2023

(51) Int. Cl.
| | |
|---|---|
| G06Q 40/06 | (2012.01) |
| G05B 19/418 | (2006.01) |
| G06F 9/48 | (2006.01) |
| G06F 9/50 | (2006.01) |
| G06F 9/54 | (2006.01) |

(52) U.S. Cl.
CPC .  G05B 19/41895 (2013.01); G05B 19/41865 (2013.01); G06F 9/4881 (2013.01); G06F 9/5005 (2013.01); G06F 9/547 (2013.01); G06F 2209/503 (2013.01); G06F 2209/547 (2013.01); G06Q 40/06 (2013.01)

(58) Field of Classification Search
None
See application file for complete search history.

(56) References Cited

U.S. PATENT DOCUMENTS

| 8,407,078 B1 * | 3/2013 | Caputo | G06Q 10/06 705/7.27 |
|---|---|---|---|
| 11,301,224 B1 | 4/2022 | Dabhi et al. | |
| 11,321,124 B2 | 5/2022 | Madkour | |
| (Continued) | | | |

FOREIGN PATENT DOCUMENTS

| EP | 2953070 A1 * | 12/2015 | G06F 16/29 |
|---|---|---|---|
| WO | WO-0106352 A2 * | 1/2001 | G06Q 10/06 |

OTHER PUBLICATIONS

Vladimir "Collaborative Assembly Task Realization using selected type of a human-robot interaction", Sep. 2019, Transportation Research Procedia 40, pp. 541-547 (Year: 2019).*

Primary Examiner — Romain Jeanty
(74) Attorney, Agent, or Firm — Leason Ellis LLP (57) ABSTRACT

Managing tasks using an application-level blue-green topology with parallel cell infrastructure rails. Each cell infrastructure rail includes a dispatcher bot and a performer bot. The dispatcher bot is configured to prepare a work task based on a received request, and the performer bot performs the work task, resulting in performed work. A discovery server includes a service registry configured to store the states of the infrastructure rails. The discovery server receives the request for the work task, and sends the request to a dispatcher bot of a specific cell infrastructure rail based on the request and the states of the cell infrastructure rails. A respective workflow cell server receives the performed work. In the case that one cell infrastructure rail experiences a problem when processing the request, the cell infrastructure rails are switched to perform the request on the other cell infrastructure rail. The method implements the system.

20 Claims, 5 Drawing Sheets

(56) References Cited

U.S. PATENT DOCUMENTS

| | | | |
|---|---|---|---|
| 2009/0204471 A1* | 8/2009 | Elenbaas | G06Q 10/06 |
| | | | 726/28 |
| 2018/0165734 A1* | 6/2018 | Yoannou | G06Q 20/401 |
| 2018/0197123 A1 | 7/2018 | Parimelazhagan et al. | |
| 2020/0380449 A1* | 12/2020 | Choi | G06N 5/04 |
| 2021/0385124 A1 | 12/2021 | Roy et al. | |
| 2022/0100639 A1 | 3/2022 | Weishaar et al. | |
| 2022/0138604 A1* | 5/2022 | Mehra | G06F 8/10 |
| | | | 706/46 |
| 2022/0377733 A1 | 11/2022 | Crane et al. | |
| 2022/0391227 A1 | 12/2022 | Grigore | |

\* cited by examiner

SYSTEM AND METHOD FOR WORK TASK MANAGEMENT USING APPLICATION-LEVEL BLUE-GREEN TOPOLOGY WITH PARALLEL INFRASTRUCTURE RAILS

FIELD OF THE DISCLOSURE

The present disclosure relates generally to work task management, and, more particularly, to a system and method configured to manage work tasks using an application-level blue-green topology with parallel infrastructures rails.

BACKGROUND OF THE DISCLOSURE

In financial systems involving wealth management (WM), robotic process automation (RPA) has been used to apply processes, applications, modules, or agents, configured as bots, to perform work tasks in support of workflow transactions. Such workflow transactions involving wealth management can include allocation of funds in a mutual fund, mutual fund plan updates, financial data corrections, financial reports, etc.

In a server architecture supporting software-as-a-service or cloud-based computing, including business process management (BPM) systems and applications known in the art, a "blue-green" topology is used to simultaneously provide a stable production system for established processes, applications, modules, and agents, as well as to provide an unstable system for processes, applications, modules, and agents undergoing development. The stable production system is designated to be the "blue" system, and the unstable system is designated to be the "green" system. Both of the blue and green systems run in parallel implemented by parallel infrastructure "rails". A router or load balancer directs incoming requests from consumers or other non-developers to the "blue" system, and directs requests from developers, quality assurance representatives, software testers, or other authorized individuals to the "green" system.

In such prior art systems, a post-release testing window for processes and applications has been limited to minimize the business impact of testing. Such a post-release testing window could not go beyond a specific date or time, such as not going beyond a Monday after maintenance over a weekend. Any deployment failure would cause a business impact, which would require a rollback of data or processes to bring a system back to business as usual (BAU). In addition, in the prior art, during the performance of a function by a process, when there is an issue or problem with an infrastructure, then the process stops, and the complete process needs to be analyzed where the process stopped. The process is then rerun either fully or partially. Such re-running of processes has caused problems with reprocessing or missing transactions during a rerun.

SUMMARY OF THE DISCLOSURE

According to an embodiment consistent with the present disclosure, a system and method are configured to manage work tasks using an application-level blue-green topology with parallel infrastructure rails.

In an embodiment, a system comprises a hardware-based processor, a memory, a green cell infrastructure rail in a blue-green topology, a blue cell infrastructure rail in the blue-green topology, a discovery server, a green workflow cell server, and a blue workflow cell server. The memory is configured to store instructions and is configured to provide the instructions to the hardware-based processor. The green cell infrastructure rail includes a green cell infrastructure rail server configured to operate a green performer bot. The blue cell infrastructure rail includes a blue cell infrastructure rail server configured to operate a blue performer bot. The discovery server is operatively connected to the green and blue cell infrastructure rails. The discovery server includes a service registry configured to store a state of the green cell infrastructure rail and a state of the blue cell infrastructure rail. The discovery server is configured to receive a request for a work task, and is configured to send the request to the green cell infrastructure rail or to the blue cell infrastructure rail based on the request and based on the states of the green and blue cell infrastructure rails. The green workflow cell server is operatively connected to the green performer bot. The blue workflow cell server is operatively connected to the blue performer bot. In the case that the green cell infrastructure rail receives the request, the green performer bot performs the work task to generate a green performed work and outputs the green performed work to the green workflow cell server. In the case that the blue cell infrastructure rail receives the request, the blue performer bot performs the work task to generate a blue performed work and outputs the blue performed work to the blue workflow cell server.

The system can further comprise a configuration server configured to store green configuration data of the green performer bot and configured to store blue configuration data of the blue performer bot. The green performer bot can be deployed in the green cell infrastructure rail based on the green configuration data, and the blue performer bot can be deployed in the blue cell infrastructure rail based on the blue configuration data. The discovery server, responsive to the states of the green and blue cell infrastructure rails, can switch the green cell infrastructure rail and the blue cell infrastructure rail. Alternatively, the system can include a user interface configured to receive input data, and the discovery server, responsive to the input data, can switch the green cell infrastructure rail and the blue cell infrastructure rail.

The system can further comprise a set of modules configured to implement the instructions provided to the hardware-based processor, with the set of modules including a queue module configured to store the work task in a queue, and the green and blue performer bots can perform the work task received from the queue. The green cell infrastructure rail can includes a green dispatcher bot, the blue cell infrastructure rail can include a blue dispatcher bot, each of the green and blue dispatcher bots can be configured to receive the request and to generate initial data required to perform the work task associated with the request, and the set of modules can further comprise a mediation module configured to receive the work task and the initial data and configured to queue the work task in the queue. Each of the green dispatcher bot and the blue dispatcher bot can be configured to receive external data from an external data source.

In another embodiment, a system comprises a hardware-based processor, a memory, a set of modules, a green cell infrastructure rail in a blue-green topology, a blue cell infrastructure rail in the blue-green topology, and a discovery server. The memory is configured to store instructions and is configured to provide the instructions to the hardware-based processor. The set of modules is configured to implement the instructions provided to the hardware-based processor, and the set of modules includes a workflow platform module including a green workflow cell server and a blue workflow cell server. The green cell infrastructure rail includes a green cell infrastructure rail server configured to operate a green performer bot. The blue cell infrastructure rail includes a blue cell infrastructure rail server configured to operate a blue performer bot. The discovery server is operatively connected to the green and blue cell infrastructure rails. The discovery server includes a service registry configured to store a state of the green cell infrastructure rail and a state of the blue cell infrastructure rail. The discovery server is configured to receive a request for a work task, and is configured to send the request to the green cell infrastructure rail or to the blue cell infrastructure rail based on the request and based on the states of the green and blue cell infrastructure rails. The green workflow cell server is operatively connected to the green performer bot. The blue workflow cell server is operatively connected to the blue performer bot. In the case that the green cell infrastructure rail receives the request, the green performer bot performs the work task to generate a green performed work and outputs the green performed work to the green workflow cell server. In the case that the blue cell infrastructure rail receives the request, the blue performer bot performs the work task to generate a blue performed work and outputs the blue performed work to the blue workflow cell server.

The set of modules can further comprise a blue-green control module including a configuration server configured to store green configuration data of the green performer bot and configured to store blue configuration data of the blue performer bot. The green performer bot can be deployed in the green cell infrastructure rail based on the green configuration data. The blue performer bot can be deployed in the blue cell infrastructure rail based on the blue configuration data. The blue-green control module can include a user interface configured to receive input data, and the discovery server, responsive to the input data, can switch the green cell infrastructure rail and the blue cell infrastructure rail. Alternatively, the discovery server, responsive to the states of the green and blue cell infrastructure rails, can switch the green cell infrastructure rail and the blue cell infrastructure rail. The set of modules can further include a queue module configured to store the work task in a queue, and the green and blue performer bots can perform the work task received from the queue. The green cell infrastructure rail can include a green dispatcher bot. The blue cell infrastructure rail can include a blue dispatcher bot. Each of the green and blue dispatcher bots can be configured to receive the request and to generate initial data required to perform the work task associated with the request. The set of modules can further comprise a mediation module configured to receive the work task and the initial data and configured to queue the work task in the queue. Each of the green dispatcher bot and the blue dispatcher bot can be configured to receive external data from an external data source.

In a further embodiment, a method comprises providing N cell infrastructure rails, including a green cell infrastructure rail and a blue cell infrastructure rail in an N-color topology in which N is greater than or equal to two. The method further comprises receiving a request for a work task, determining a first cell infrastructure rail of the N cell infrastructure rails to which is routed the request, activating a dispatcher bot associated with the first cell infrastructure rail, processing the request using the dispatcher bot, queuing the work task in a queue, and performing the work task using a performer bot associated with the first cell infrastructure rail.

For the N cell infrastructure rails, N can equal 2. Processing the request can include generating initial data required to perform the work task associated with the request using the dispatcher bot, and dispatching the work task to a mediation module. Determining a first cell infrastructure rail can include determining the case that the first cell infrastructure rail generates erroneous data, switching the first cell infrastructure rail with a second cell infrastructure rail from among the N cell infrastructure rails, and setting the second cell infrastructure rail as the first infrastructure rail. The switching can include receiving a state of the first cell infrastructure rail, and responsive to the state, performing the switching. Alternatively, the switching can include receiving input data at a user interface, and responsive to the input data, performing the switching.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 100 and method 300 configured to manage work tasks using an application-level blue-green topology with parallel infrastructure rails. Such a system 100 and method 300 implement robotic process automation (RPA) by bots, implemented as modules, processes, applications, or agents, to be applied to various work tasks in a technological field. In an embodiment, the system 100 and method 300 perform business process management (BPM) directed to wealth management (WM) in financial organizations using the application-level blue-green topology with two parallel infrastructure rails in an N-color topology in which N equal to two. An example of a blue-green topology is described in U.S. Pat. No. 11,595,495, which is hereby incorporated by reference. In alternative embodiments, the system 100 can implement an N-colored topology with parallel infrastructure rails, with N greater than 2. In such an N-colored topology, N infrastructure rails operate in parallel. The system 100 and method 300 allow an RPA-based bot to be initiated and to be switched from one infrastructure rail to other infrastructure rail in real time when the switch is made. In the work task management system 100, the two parallel infrastructure rails are operationally isolated while dispatcher bots and performer bots of each infrastructure rail operate in tandem.

Figure 1:
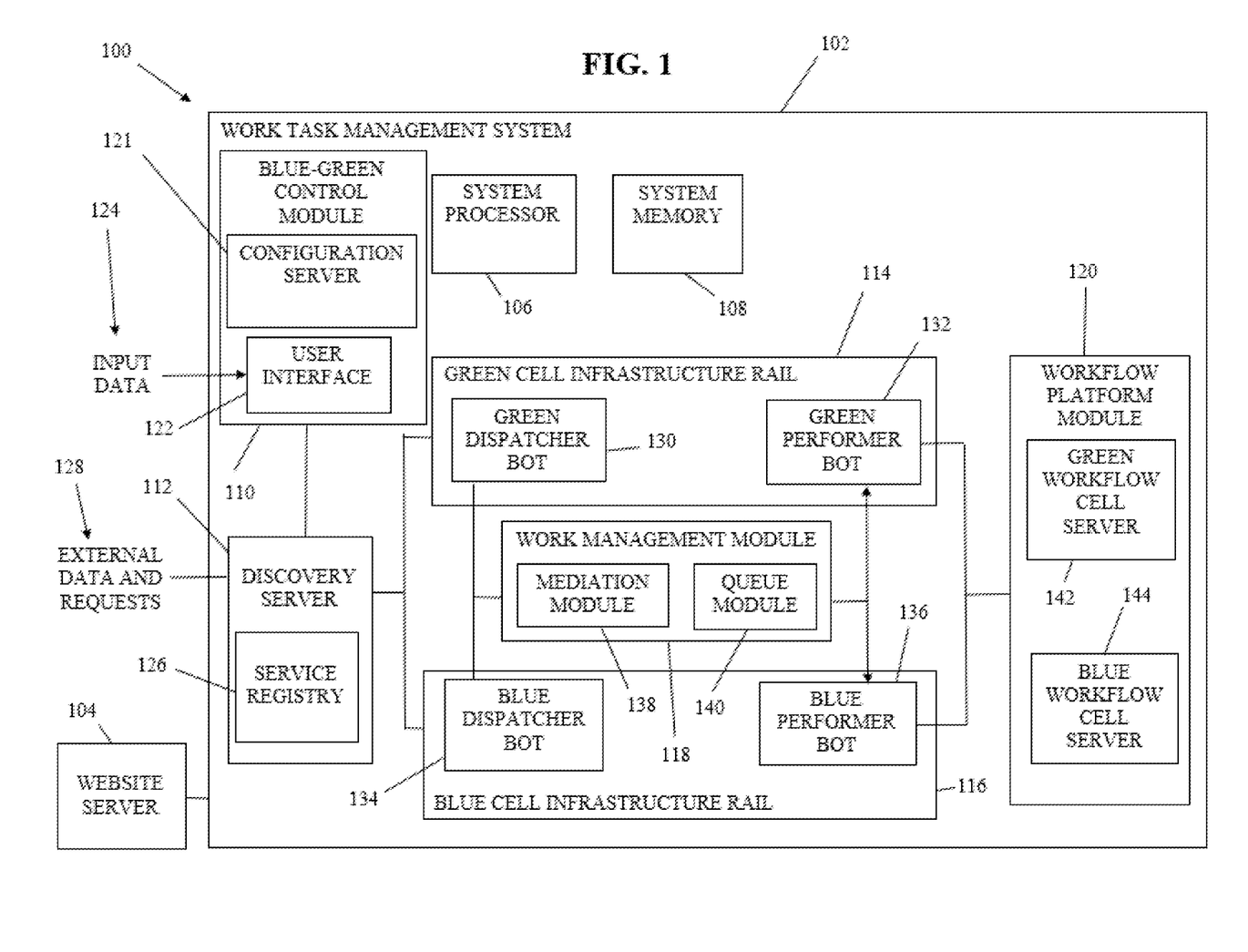
FIG. 1 is a schematic of a system, according to an embodiment.

Referring to FIG. 1, the system 100 includes a work task management system 102 operatively connected to a website server 104 using a network. The network can be the Internet, and so the website server 104 hosts Internet-accessible websites. Alternatively, the network can be an intranet of an organization, and so the website server 104 hosts websites internally accessible by users of the intranet. The work task management system 102 includes a system processor 106, a system memory 108, a blue-green control module 110, a discovery server 112, a green cell infrastructure rail 114, a blue cell infrastructure rail 116, a work management module 118, and a workflow platform module 120. Each of the green cell infrastructure rail 114 and the blue cell infrastructure rail 116 is implemented by a server or at least one cluster of a plurality of servers, and the server or the at least one cluster is grouped into a cell. Accordingly, the green cell infrastructure rail 114 constitutes a green cell, and the blue cell infrastructure rail 116 constitutes a blue cell.

The blue-green control module 110 operates as an App Level blue-green control module. The blue-green control module 110 includes a configuration server 121 and a user interface 122. The configuration server 121 is configured to store configuration data regarding bots, as described below. The user interface 122 is configured to receive input data 124 in electronic form. For example, the user interface 122 includes an input device, as described below, configured to receive the input data 124 from a user, such as a system administrator, a financial manager, or a developer of modules, processes, applications, or agents, such as from a keyboard, microphone, file, database or via an application program interface to another program or module. In one embodiment, the user interface 122 is an ANGULAR-based user interface. In an alternative embodiment, the user interface 122 is any known user interface written in any known programming language. The discovery server 112 includes a service registry 126. The service registry 126 includes, for example, a memory configured to store data such as state data regarding bots implemented by modules, processes, applications, or agents and operating in the work task management system 102. As described herein, a bot includes a module. Alternatively, a bot includes an application. In another alternative embodiment, a bot includes a process. Furthermore, a bot includes an agent, such as an artificial intelligence (AI) agent. The bots perform specific work tasks, such a dispatcher work task, a performer work task, or other specific work tasks. A dispatcher bot, as described below, is configured to perform work tasks directed to collecting input data, such as inputs from various sources. The various sources include emails, databases, computer files, user interfaces, or any other known input data including the variety noted above. A performer bot, as described below, is configured to perform work tasks directed to accessing websites, such as websites stored on the website server 104, and gathering data from such websites by scraping the websites. A performer bot is also configured to perform work tasks directed to enriching gathered data. In addition, a performer bot is configured to perform work tasks directed to creating a workflow transaction for a user to review and approve. The user can be a system administrator, a financial manager, or a developer of modules, processes, applications, or agents, as described herein. The discovery server 112 is configured to receive external data 128, for example, from a user, as described herein. In one embodiment, the external data 128 includes a request for a work task. The external data 128 are described in greater detail below. The discovery server 112 is also operatively connected to the blue-green control module 110.

The green cell infrastructure rail 114 includes at least a green dispatcher bot 130 and a green performer bot 132. The blue cell infrastructure rail 116 includes at least a blue dispatcher bot 134 and a blue performer bot 136. In one embodiment, the bots 130, 132, 134, 136 are UIPATH-based bots. In an alternative embodiment, the bots 130, 132, 134, 136 are any known processes, applications, modules, or agents implementing bots. In addition, besides the dispatcher bots 130, 134 and the performer bots 132, 136, other specialized bots are included in either of the cell infrastructure rails 114, 116. The green cell infrastructure rail 114 and the blue cell infrastructure rail 116 are operatively connected to the discovery server 112. In particular, the dispatcher bots 130, 134 are operatively connected to the discovery server 112. In an embodiment, the data stored in the service registry 126 includes data indicating the state of the dispatcher bots 130, 134. The discovery server 112 is configured to regularly perform health checks of the dispatcher bots 130, 134. For example, the discovery server 112 is configured to perform the health checks every two seconds to ensure that services performed by at least the dispatcher bots 130, 134 are within acceptable operating specifications. In an embodiment, the discovery server 112 invokes a health check endpoint/URL, such as/healthcheck, against dispatcher bots, such as the dispatcher bots 130, 134. In response to the health check endpoint/URL, each the dispatcher bots 130, 134 is configured to send a message to the discovery server 112 indicating that the respective bot 130, 134 has a "READY" state, which depicts the respective bot as being ready to receive and process work.

The work management module 118 includes a mediation module 138 and a queue module 140. The mediation module 138 is operatively connected to the dispatcher bots 130, 134. The mediation module 138 is configured to receive output data from the dispatcher bots 130, 134, such as data corresponding to work. The queue module 140 is configured to implement at least one queue. The queue module 140 is operatively connected to the mediation module 138. The performer bots 132, 136 are operatively connected to the queue module 140. The queue module 140 is configured to output work-related data to the performer bots 132, 136. For example, the work-related data includes transaction data specifying transactions involved in the work. In an embodiment, the mediation module 138 includes a mediation engine configured to receive work from any of the dispatcher bots 130, 134, and to publish or otherwise output a work-related message onto an external queue, such as a message queue (MQ) stored in the queue module 140, as described below. For example, the message queue is implemented by an MQ system commercially available from IBM CORPORATION. Alternatively, the message queue is implemented by any known queuing system.

In case of failure of the work-related message to be stored onto the external queue, the mediation engine is configured to control the number of re-tries to store the work-related message onto the external queue before the mediation modules 138 transfers the transaction to be stored on a dead letter queue. The queue module 140 stores the dead letter queue. Alternatively, the system memory 108 stores the dead letter queue. In another alternative embodiment, the dead letter queue is stored in other memory associated with the work task management system 102.

The workflow platform module 120 includes a green workflow cell server 142 and a blue workflow cell server 144. In an embodiment, each of the workflow cell servers 142, 144 includes a server or at least one cluster of a plurality of servers, and the server or the at least one cluster is grouped into a respective cell of the workflow cell servers 142, 144. The workflow platform module 120 is operatively connected to the cell infrastructure rails 114, 116. In particular, the workflow platform module 120 is operatively connected to the performer bots 132, 136. In an embodiment, the workflow platform module 120 receives data output by the performer bots 132, 136. The workflow platform module 120 maintains a workflow platform for the work task management system 102. For example, the workflow platform is a platform external to the components implementing RPA of the system 100. The workflow platform is responsible for performing tasks list management for wealth management users such as a financial advisor (FA), a customer service advisor (CSA), financial management operators (Ops), etc. The disclosed RPA-bot framework implemented by the system 100 and method is configured to automate manual review and approval of tasks residing in the workflow platform maintained by the workflow platform module 120.

Figure 2:
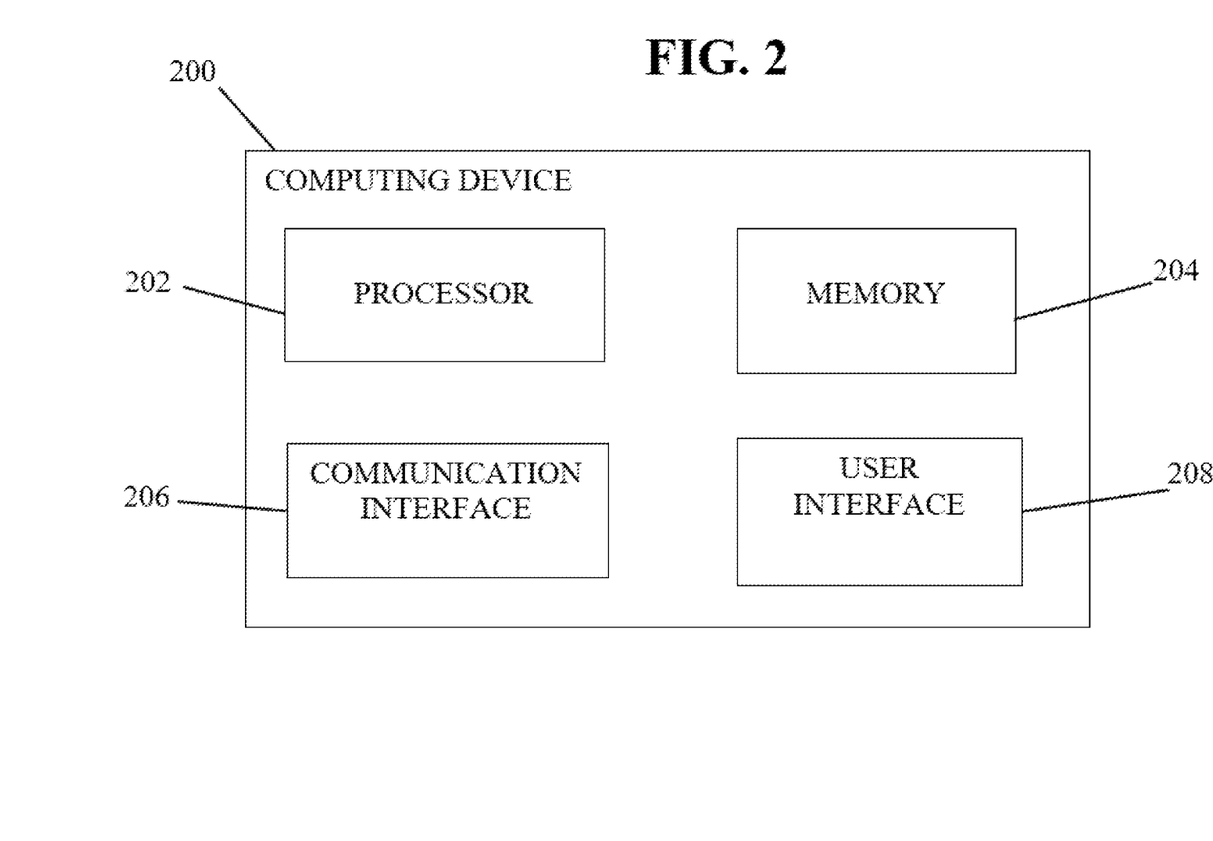
FIG. 2 is a schematic of a computing device used in the embodiment.

FIG. 2 illustrates a schematic of a computing device 200 including a processor 202 having code therein, a memory 204, and a communication interface 206. Optionally, the computing device 200 can include a user interface 208, such as an input device, an output device, or an input/output device. The processor 202, the memory 204, the communication interface 206, and the user interface 208 are operatively connected to each other via any known connections, such as a system bus, a network, etc. Any component, combination of components, modules, bots, or agents of the system 100 in FIG. 1 can be implemented by a respective computing device 200. For example, each of the website server 104, the system processor 106, the system memory 108, the blue-green control module 110, the discovery server 112, the green cell infrastructure rail 114, the blue cell infrastructure rail 116, the work management module 118, the workflow platform module 120, the configuration server 121, the green dispatcher bot 130, the green performer bot 132, the blue dispatcher bot 134, the blue performer bot 136, the mediation module 138, the queue module 140, the green workflow cell server 142, and the blue workflow cell server 144 shown in FIG. 1 can be implemented by a respective computing device 200 shown in FIG. 2 and described below.

It is to be understood that the computing device 200 can include different components. Alternatively, the computing device 200 can include additional components. In another alternative embodiment, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can include one or more general-purpose processors. Alternatively, the processor 202 can include one or more special-purpose processors. The processor 202 can be integrated in whole or in part with the memory 204, the communication interface 206, and the user interface 208. In another alternative embodiment, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative embodiment, the processor 202 can include a plurality of nodes or artificial neurons configured as an artificial neural network. The processor 202 can be configured to implement any known artificial neural network, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative embodiment, the instructions are executable by the processor 202 to cause the computing device 200 to execute an artificial neural network. In one embodiment, the code of the work task management system 102 or components of the work task management system 102 is written in JAVA. In an alternative embodiment, the code of the work task management system 102 or components of the work task management system 102 is written in any known programming language. The processor 202 can be implemented using hardware or software, such as the code. The processor 202 can implement a system, a sub-system, a module, or a bot, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol. For example, the discovery server 112 in FIG. 1 can include a communication interface 206 configured to receive the external data and requests 128. In another example, the work task management system 102 can include a communication interface 206 configured to communicate with and access data from the website server 104 in FIG. 1.

The user interface 208 can be any known device configured to perform user input and output functions. For example, the user interface 208 can implement the user interface 122 in FIG. 1. The user interface 208 can be configured to receive an input from a user, such as the input data 124. In another example, the discovery server 112 in FIG. 1 can include a user interface 208 configured to receive the external data and requests 128. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

The system 100 and method 300 initiate operation of a bot to implement a work task or a workflow transaction, such as allocation of funds in a mutual fund for wealth management in financial organizations. Other financial-based work tasks can include mutual fund plan updates, financial data corrections, financial reports, financial document processing, manual activity, display screen scraping to obtain financial data, processing and updating of EXCEL spreadsheets, or any other known work tasks.

Figure 3A:
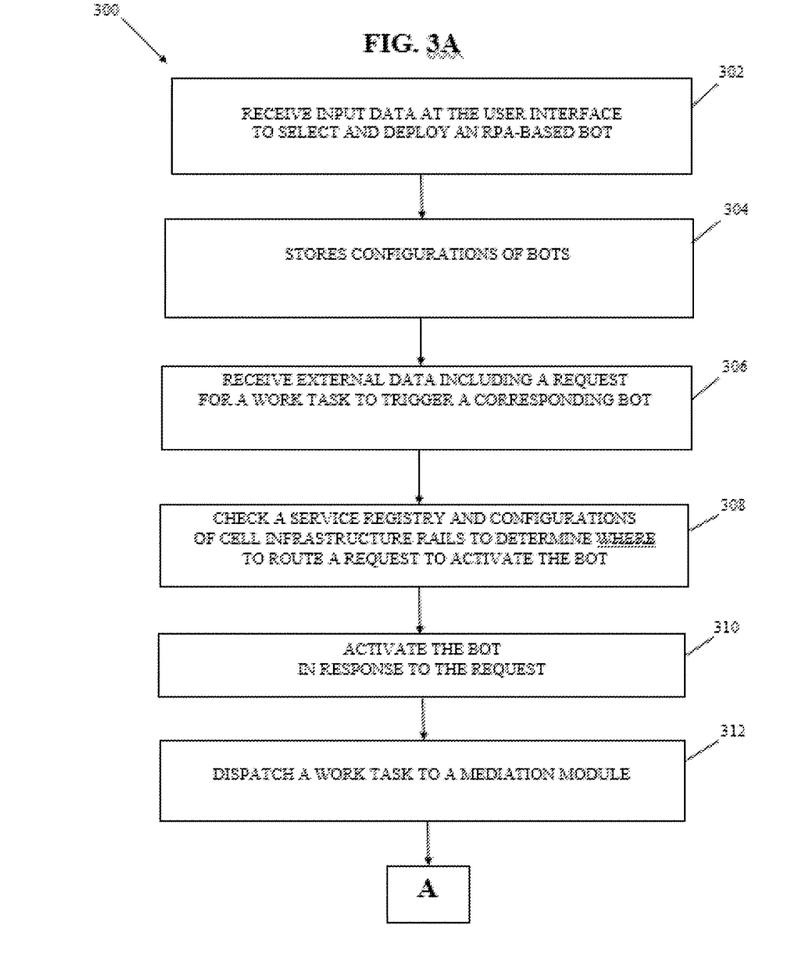
FIGS. 3A-3B illustrate a flowchart of a method of operation of the system, according to the embodiment.
Figure 3B:
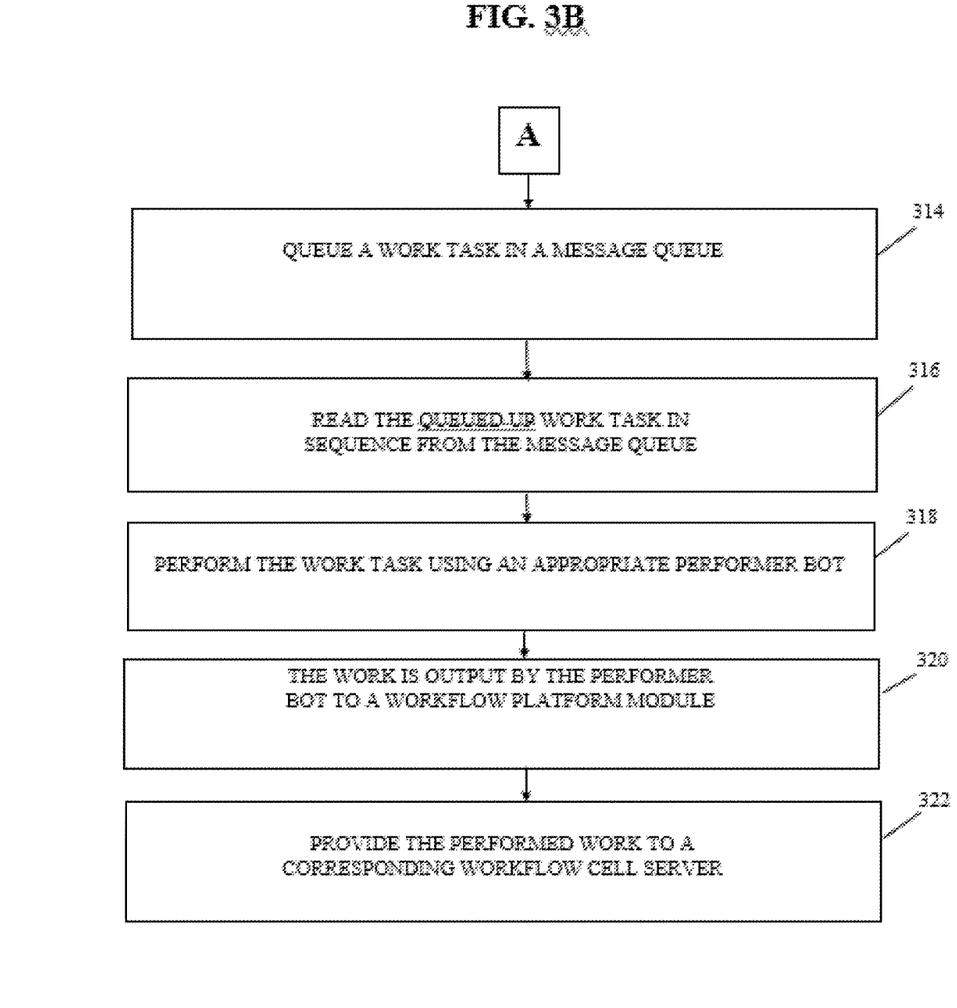

Referring to FIGS. 3A-3B, the method 300 describes operation of the system 100 including the work task management system 102 and a website server 104. In one implementation of such a work task management system 102, as described above in connection with FIG. 1, the work task management system 102 includes a system processor 106, a system memory 108, a blue-green control module 110 including a configuration server 121 and a user interface 122, a discovery server 112 including a service registry 126, a green cell infrastructure rail 114 including a green dispatcher bot 130 and a green performer bot 132, a blue cell infrastructure rail 116 including a blue dispatcher bot 134 and a blue performer bot 136, a work management module 118 including a mediation module 138 and a queue module 140, and a workflow platform module 120 including a green workflow cell server 142 and a blue workflow cell server 144.

In one embodiment, the method 300 receives the input data 124 at the user interface 122 allowing a user, such as financial manager, to select and deploy an RPA-based bot to perform a specific work task in step 302. In one embodiment, the RPA-based bot is a module. The input data 124 includes a user selection of the RPA-based bot to be a dispatcher bot, a performer bot, or another work task bot. In one embodiment, the RPA-based bot is stored in the system memory 108. The selection of the RPA-bot in the input data 124 is processed by the system processor 106 to retrieve the stored RPA-bot from the system memory 108. The selected RPA-based bot is then deployed to operate on one of the cell infrastructure rails 114, 116. In an alternative embodiment, the selected RPA-based bot is input as the input data 124 through the user interface 122. In addition, through the user interface 122, the user selects the cell infrastructure rail 114, 116 in which the RPA-based bot is to be deployed and operate. In another embodiment, through the user interface 122, the user instructs the work task management system 102 to flip the blue cell infrastructure rail 116 to be configured to operate as a green cell infrastructure rail, and the previous green cell infrastructure rail 114 is configured to operate as a blue cell infrastructure rail, as described below. Also, through the user interface 122, the user instructs the work task management system 102 to flip the green cell infrastructure rail 114 to be configured to operate as a blue cell infrastructure rail, and the previous blue cell infrastructure rail 116 is configured to operate as a green cell infrastructure rail, as described below. The switching or flipping of the cell infrastructure rails 114, 116 is based on the needs of the work task management system 102. The user interface 122 also allows a user to view the status of the cell infrastructure rails 114, 116, such as to determine which of the cell infrastructure rails 114, 116 is active. In addition, the user interface 122 allows a user to view the data output by a bot such as performed work tasks. In an embodiment, the user interface 122 is available only to authorized users, such as production support team members.

The method 300 then stores a configuration of the bots in the work task management system 102 in step 304. In one embodiment, the stored configuration corresponds to the selected RPA-based bot. The configuration of bots is stored as configuration data by the blue-green control module 110. In one embodiment, the configuration data is stored in a memory of the blue-green control module 110. Alternatively, the configuration data is stored in the configuration server 121 of the blue-green control module 110. For example, one embodiment of the configuration server 121 is an APACHE ZOOKEEPER server, which is an open-source server configured to perform highly reliable distributed coordination of applications, such as bots and cloud applications. In another alternative embodiment, the blue-green control module 110 stores the configuration in the system memory 108 as configuration data. In one embodiment, the configuration data corresponds to specifications of the selected RPA-based bot. In another embodiment, the configuration data specifies the state of the bots in the cell infrastructure rails 114, 116. An example of a configuration of the RPA-based bot in the ZOOKEEPER (ZK) server is listed below:

```
{
    "zkNode": "bpm",
    "zkBundleId": "bluegreen",
    "zkServiceName": "appLevelBlueGreen",
    "endpointURL": "AppLevelBlueGreen",
    "serviceConfig": {
        "apps": [
            {
                "appName": "RPA BOT",
                "cell": "GREEN", -- Other value could be BLUE
                "rail": "DEFAULT"
            }
        ]
    }
}
```

The example configuration above specifies that the bot having the appName "RPA BOT" is assigned to a green cell in the green cell infrastructure rail 114 as a "default" rail. The discovery server 112 is configured to receive the configuration data for an RPA-based bot from the configuration server 121, and is configured to process the RPA-based bot and its configuration to implement the RPA-based bot as a bot in one of the cell infrastructure rails 114, 116. In an embodiment, the received configuration data is stored in the service registry 126.

Once an RPA-based bot and other bots are configured and deployed in either one of the cell infrastructure rails 114, 116, the discovery server 112 receives external data or requests 128 to trigger a specified bot to operate in step 306 to perform a work task corresponding to the specified bot. The discovery server 112 then checks the service registry 126 as well as the states and configurations of the green cell infrastructure rail 114 and the blue cell infrastructure rail 116 to determine where to route a request to activate the corresponding bot in step 308. That is, depending on the needs and states of the cell infrastructure rails 114, 116, the request is routed to an appropriate cell infrastructure rail 114, 116. Only one bot running in either the green cell infrastructure rail 114 or the blue cell infrastructure rail 116 receives the activation request.

In operation, the discovery server 112 evaluates predetermined conditions to determine where the work needs to be routed. For example, the discovery server 112 determines whether both of the blue and green cells, that is, both of the infrastructure rails 114, 116 are up and running, as determined by healthcheck endpoint described above. In another example, the discovery server 112 determines the default cell configured in the user interface 122 of the App Level Blue-Green control module 110. The default cell is determined by the discovery server 112 examining the configurations stored in the configuration server 121. For example, the configuration server 121 implements an APACHE ZOOKEEPER server, as described above, which the discovery server 112 accesses to examine the stored configurations.

In a further example, in the case that both cells are up, then the discovery server 112 examines the configurations stored in the APACHE ZOOKEEPER server of the configuration server 121 to determine which cell is set up as default. In another example, in the case that one cell is down and another cell is up and running, then the discovery server 112 gives precedence to the running cell and routes the work to the running cell accordingly.

In still another example, if there is an issue or problem with sending the request to the green dispatcher bot 130 in the green cell infrastructure rail 114, the work task management system 102 is configured by code executing in the processor to respond in real time to send the request to the blue dispatcher bot 134 in the blue cell infrastructure rail 116. Similarly, when evaluating the state of the cell infrastructure rails 114, 116, if there is an issue or problem with sending the request to the blue dispatcher bot 134 in the blue cell infrastructure rail 116, then the work task management system 102 is configured by code executing in the processor to respond in real time to send the request to the green dispatcher bot 130 in the green cell infrastructure rail 114. For example, if the request involves a work task which is directed to a stable process, then the request is sent to the blue dispatcher bot 134 in the blue cell infrastructure rail 116. Alternatively, if the request involves a work task which is directed to an unstable process such as a process in development, then the system processor 106 is configured to have the request sent to the green dispatcher bot 130 in the green cell infrastructure rail 114.

Figure 4:
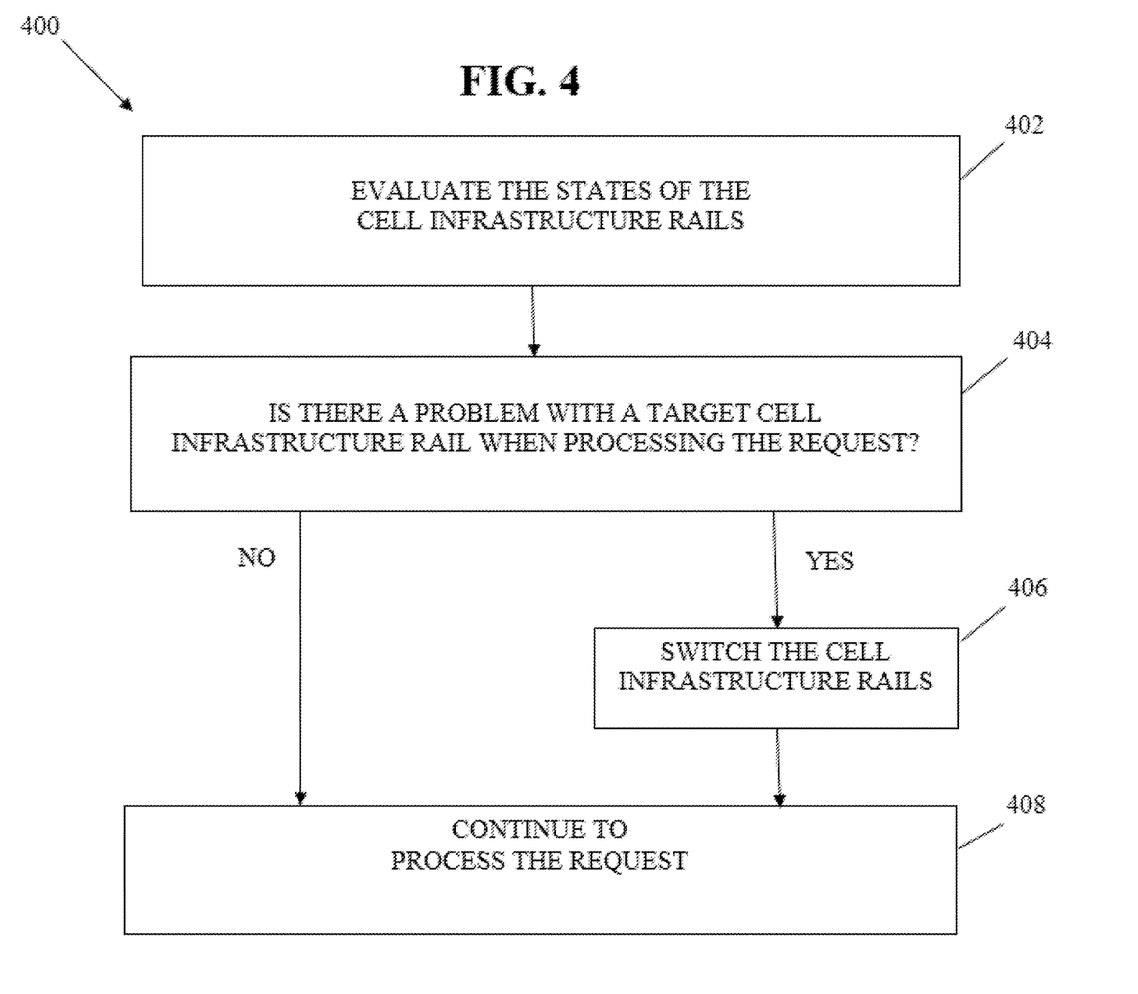
FIG. 4 illustrates a flowchart of a method configured to switch cell infrastructure rails.

In another alternative embodiment, step 308 in FIGS. 3A-3B is performed by the method 400 shown in FIG. 4. Referring to FIG. 4, the method 400 evaluates the states of the cell infrastructure rails 114, 116 using the discovery server 112 in step 402. The method 400 determines in step 404, via code executing in the system processor 106, if there is an issue or problem with sending the request to a target cell infrastructure rail. For example, the issue or problem can include a dispatcher bot which generates erroneous data as the initial data for a work task associated with the request. Such erroneous initial data can corrupt the performance of the work task or prevent completion of the work task.

In another example of an issue or problem which determines the need to switch the rails 114, 116, a network failure is a condition for switching rails. In the case that there is a network failure during connection between a dispatcher bot 130, 134 and the mediation engine of the mediation module 138, or if there is a network failure between the discovery server 112 and any dispatcher bot 130, 134, then work is not routed to the faulty cell. An application support group can include a network monitoring mechanism to determine when such network failures occur. In an embodiment, the work task management system 102 can interact with the network monitoring mechanism to generate and send an alert of the network failure to the application support group. In the case that the network failure condition is first acknowledged by the application support group, then the user interface 122, as the App Level Blue Green user interface, is used to switch the traffic to a working cell.

In a further example of an issue or problem which determines the need to switch the rails 114, 116, a health check of the cells can indicate that a checked cell is not responding with a message indicating a "READY" state, as described above. In the case that the checked cell is not responding, the work task management system 102 classifies the non-responsive cell as a faulty cell, and work is not routed to the faulty cell, for example, by the work management module 118.

In particular, the method 400 implements code in the system processor 106 that determines if there is an issue or problem with sending the request to the green dispatcher bot 130 in the green cell infrastructure rail 114. If there is an issue or problem with sending the request to the green dispatcher bot 130 in the green cell infrastructure rail 114, then the work task management system 102 is configured by code executing in the system processor 106 to respond in real time to switch the green cell infrastructure rail 114 to be a blue cell infrastructure rail, and the previous blue cell infrastructure rail 116 is switched to be a green cell infrastructure rail in step 406. Similarly, if there is an issue or problem with sending the request to the blue dispatcher bot 134 in the blue cell infrastructure rail 116, then the work task management system 102 is configured by code executing in the system processor 106 to respond in real time to switch the blue cell infrastructure rail 116 to be a green cell infrastructure rail, and the previous green cell infrastructure rail 114 is switched to be a blue cell infrastructure rail in step 406. In one embodiment, the discovery server 112, responsive to the states of the cell infrastructure rails 114, 116, performs the switching of the cell infrastructure rails 114, 116. In another embodiment, the discovery server 112, responsive to the input data 124 received through the user interface 122, performs the switching of the cell infrastructure rails 114, 116. After step 406, the method 400 proceeds to step 408 to continue to process the request in step 308 of FIGS. 3A-3B. Otherwise, in step 404, if there is no issue or problem, then the method 400 proceeds to step 408 to continue to process the request in step 308 of FIGS. 3A-3B. Accordingly, process isolation is implemented to run a single RPA process or bot in any infrastructure rail, and to switch the infrastructure rails in real time without making changes in any other component when the rail switching is performed.

Each of the dispatcher bots 130, 134 is configured to perform work tasks directed to collecting input data, such as inputs from various sources. The various sources include emails, databases, computer files, user interfaces, or any other known input data, including the varieties mentioned hereinabove. For example, the input data can be the external data 128 accessible through the discovery server 112, with the external data 128 provided by external data sources through a network. The dispatcher bots 130, 134 then upload the collected input data to a queue. In one embodiment, the queue is stored in the system memory 108. In an alternative embodiment, the queue is stored in the work management module 118 by the queue module 140. In a further alternative embodiment, the queue is an orchestrator queue. For example, an orchestrator queue is associated with a respective dispatcher bot 130, 134. The orchestrator queue is configured to interface with the UIPATH-based bots 130, 132, 134, 136. For example, the orchestrator queue can be a messaging queue, such as an IBM MQ, configured to receive work and to queue the work for a performer bot 132, 136 to read the queued work from the orchestrator queue.

Referring back to FIGS. 3A-3B, the method 300 uses the system processor 106 configured by code to then activate the bot in step 310 in the corresponding cell infrastructure rail 114, 116 in response to the request and based on predetermined criteria and conditions reflecting the needs and the states of the cell infrastructure rails 114, 116. The predetermined criteria and conditions are evaluated by the discovery server 112 to determine where the work needs to be routed. For example, the discovery server 112 determines whether both of the blue and green cells, that is, both of the infrastructure rails 114, 116 are up and running, as determined by healthcheck endpoint described above. In another example, the discovery server 112 determines the default cell configured in the user interface 122 of the App Level Blue-Green control module 110. The default cell is determined by the discovery server 112 examining the configurations stored in the configuration server 121. For example, the configuration server 121 implements an APACHE ZOOKEEPER server, as described above, which the discovery server 112 accesses to examine the stored configurations.

In a further example, in the case that both cells are up, then the discovery server 112 examines the configurations stored in the APACHE ZOOKEEPER server of the configuration server 121 to determine which cell is set up as default. In another example, in the case that one cell is down and another cell is up and running, then the discovery server 112 gives precedence to the running cell and routes the work to the running cell accordingly.

Each dispatcher bot 130, 134 is configured by code executing in the system processor 106 to prepare initial data required to perform a work task associated with the request. Each dispatcher bot 130, 134 is also configured by code to divide a work task into multiple sub-tasks. As shown in FIGS. 3A-3B, the corresponding dispatcher bot 130, 134 dispatches the work task or the sub-tasks to the work management module 118 in step 312 to be processed by the mediation module 138. The work management module 118 operates external to the blue-green topology of the cell infrastructure rails 114, 116.

In an embodiment, the initial data prepared by a dispatcher bot 130, 134 is in the format of JavaScript Object Notation (JSON) messages. Such JSON messages are sent by a dispatcher bot 130, 134 to a corresponding performer bot 132, 136 to perform a work task. An example JSON message is:

{"Unique ID": "142482830","Status":"NEW","ExceptionRemarks":"Any Exception goes here"} such that the Unique ID represents a work item identification (ID) or work task ID which a performer bot 132, 136 needs to perform the corresponding work task. In the example above, the Status represents that the work task is a new work task. The JSON message optionally includes an exception, as shown above. In the case of an exception, the corresponding performer bot 132, 136 enriches the JSON message with an exception trace.

The method 300 is configured by code executing in the system processor 106 to then queue up the dispatched work task in the message queue stored in the queue module 140 using the mediation module 138 in step 314. Since the work management module 118 operates external to the blue-green topology of the cell infrastructure rails 114, 116, the message queue is maintained external to the blue-green topology of the cell infrastructure rails 114, 116.

Based on whether the work task is directed to an unstable process or to a stable process, the green performer bot 132 or the blue performer bot 136, respectively, reads the queued up work task in sequence from the message queue in step 316, and the respective performer bot 132, 136 begins performing the work task in step 318 in the respective cell infrastructure rail 114, 116. As described above, each performer bot 132, 136 is configured by code executing in the system processor 106 to perform work tasks directed to accessing websites, such as websites stored on the website server 104, and gathering data from such websites by scraping websites. Each performer bot 132, 136 is also configured by code executing in the system processor 106 to perform work tasks directed to enriching gathered data. In addition, each performer bot 132, 136 is configured by code executing in the system processor 106 to perform work tasks directed to creating a performed work or workflow transaction for a user to review and approve. Such performed work or workflow transactions include the allocation of funds in a mutual fund for wealth management in financial organizations, mutual fund plan updates, financial data corrections, financial reports, financial document processing, manual activity, display screen scraping to obtain financial data, processing and updating of EXCEL spreadsheets, or any other known work or workflow transactions.

The performed work is then output by the corresponding performer bot 132, 136 to the workflow platform module 120 in step 320. The performed work is then provided to a corresponding workflow cell server 142, 144 in step 322 by virtue of implementing code executing in the system processor 106. If the performed work is directed to an unstable process, such as a process in development, then the performed work is sent to the green workflow cell server 142 in step 322. Otherwise, the performed work is directed to a stable process, and so the performed work is sent to the blue workflow cell server 144 in step 322. The workflow platform module 120 and the workflow cell servers 142, 144 are used by any user, such as production support team members, to review or approve the performed work.

In addition, if a performer bot 132, 136 requires a work task to be worked on by any production support team or team member, the required work task is created in the workflow platform module 120. For example, if a work task is directed to an unstable process, such a work task is created in the green workflow cell server 142, and is sent to the green performer bot 132 in the green cell infrastructure rail 114. Otherwise, if a work task is directed to a stable process, such a work task is created in the blue workflow cell server 144, and is sent to the blue performer bot 136 in the blue cell infrastructure rail 116.

Using the system 100 and method 300, a production support team retains the ability to deploy bots such as RPA-based bots and to conduct prolonged testing. Once successful testing is completed, the traffic of processes can be switched or flipped to a new deployment in real time. In addition, a production support team can deploy code and bots on a "dark" rail, such as the green cell infrastructure rail 114 or to an unused cell infrastructure rail, without impacting a live environment of functioning bots on the "hot" or live rail, such as the blue cell infrastructure rail 116. In the event of issues or problems with the bots or processes, the system 100 and method 300 can switch or flip the rails in real time to avoid significant impact on the systems of an organization, such as financial systems involving clients.

The system 100 and method 300 implement multi-level failover for the application-level blue green topology using code executing in one or more processors, such as the system processor 106. In addition, the system 100 and method 300 allow for relatively easy reversion of a financial system to previous versions in the event that a given bot, such as a newly implemented bot, has issues or problems. For example, if a given bot causes a product outage, the system 100 and method 300 permit real time recovery from such an outage by reverting to an earlier state without the given bot. The system 100 and method 300 also increase the utilization of the infrastructures implementing the financial system of an organization. Using the system 100 and method 300, the RPA infrastructure is capable of operating with 24/7 reliability.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including." "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including." "comprising," "having." "containing." "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
a hardware-based processor;
a memory configured to store instructions and configured to provide the instructions to the hardware-based processor;
a green cell infrastructure rail in a blue-green topology, the green cell infrastructure rail including:
a green cell infrastructure rail server configured to operate a green performer bot;
a blue cell infrastructure rail in the blue-green topology, the blue cell infrastructure rail including:
a blue cell infrastructure rail server configured to operate a blue performer bot;
a discovery server operatively connected to the green and blue cell infrastructure rails, wherein the discovery server includes a service registry configured to store a state of the green cell infrastructure rail and a state of the blue cell infrastructure rail, wherein the discovery server is configured to receive a request for a work task, and is configured to send the request to the green cell infrastructure rail or to the blue cell infrastructure rail based on the request and based on the states of the green and blue cell infrastructure rails;
a green workflow cell server operatively connected to the green performer bot; and
a blue workflow cell server operatively connected to the blue performer bot,
wherein in the case that the green cell infrastructure rail receives the request, the green performer bot performs the work task to generate a green performed work and outputs the green performed work to the green workflow cell server, and
wherein in the case that the blue cell infrastructure rail receives the request, the blue performer bot performs the work task to generate a blue performed work and outputs the blue performed work to the blue workflow cell server.

2. The system of claim 1, further comprising:
a configuration server configured to store green configuration data of the green performer bot and configured to store blue configuration data of the blue performer bot, wherein the green performer bot is deployed in the green cell infrastructure rail based on the green configuration data, and wherein the blue performer bot is deployed in the blue cell infrastructure rail based on the blue configuration data.

3. The system of claim 1, wherein the discovery server, responsive to the states of the green and blue cell infrastructure rails, switches the green cell infrastructure rail and the blue cell infrastructure rail.

4. The system of claim 1, further comprising:

a user interface configured to receive input data, and wherein the discovery server, responsive to the input data, switches the green cell infrastructure rail and the blue cell infrastructure rail.

5. The system of claim 1, further comprising a set of modules configured to implement the instructions provided to the hardware-based processor, the set of modules including:

a queue module configured to store the work task in a queue, and wherein the green and blue performer bots perform the work task received from the queue.

6. The system of claim 5, wherein the green cell infrastructure rail includes:

a green dispatcher bot, wherein the blue cell infrastructure rail includes:

a blue dispatcher bot, wherein each of the green and blue dispatcher bots is configured to receive the request and to generate initial data required to perform the work task associated with the request, and wherein the set of modules further comprises:

a mediation module configured to receive the work task and the initial data and configured to queue the work task in the queue.

7. The system of claim 6, wherein each of the green dispatcher bot and the blue dispatcher bot is configured to receive external data from an external data source.

8. A system, comprising:

a hardware-based processor;

a memory configured to store instructions and configured to provide the instructions to the hardware-based processor;

a set of modules configured to implement the instructions provided to the hardware-based processor, the set of modules including:

a workflow platform module including:

a green workflow cell server; and a blue workflow cell server;

a green cell infrastructure rail in a blue-green topology, the green cell infrastructure rail including:

a green cell infrastructure rail server configured to operate a green performer bot;

a blue cell infrastructure rail in the blue-green topology, the blue cell infrastructure rail including:

a blue cell infrastructure rail server configured to operate a blue performer bot;

a discovery server operatively connected to the green and blue cell infrastructure rails, wherein the discovery server includes a service registry configured to store a state of the green cell infrastructure rail and a state of the blue cell infrastructure rail, wherein the discovery server is configured to receive a request for a work task, and is configured to send the request to the green cell infrastructure rail or to the blue cell infrastructure rail based on the request and based on the states of the green and blue cell infrastructure rails, wherein the green workflow cell server is operatively connected to the green performer bot, wherein the blue workflow cell server is operatively connected to the blue performer bot, wherein in the case that the green cell infrastructure rail receives the request, the green performer bot performs the work task to generate a green performed work and outputs the green performed work to the green workflow cell server, and wherein in the case that the blue cell infrastructure rail receives the request, the blue performer bot performs the work task to generate a blue performed work and outputs the blue performed work to the blue workflow cell server.

9. The system of claim 8, wherein the set of modules further comprises:

a blue-green control module including:

a configuration server configured to store green configuration data of the green performer bot and configured to store blue configuration data of the blue performer bot, wherein the green performer bot is deployed in the green cell infrastructure rail based on the green configuration data, and wherein the blue performer bot is deployed in the blue cell infrastructure rail based on the blue configuration data.

10. The system of claim 9, wherein the blue-green control module includes:

a user interface configured to receive input data, and wherein the discovery server, responsive to the input data, switches the green cell infrastructure rail and the blue cell infrastructure rail.

11. The system of claim 8, wherein the discovery server, responsive to the states of the green and blue cell infrastructure rails, switches the green cell infrastructure rail and the blue cell infrastructure rail.

12. The system of claim 8, wherein the set of modules further includes:

a queue module configured to store the work task in a queue, and wherein the green and blue performer bots are configured to perform the work task received from the queue.

13. The system of claim 12, wherein the green cell infrastructure rail includes:

a green dispatcher bot, wherein the blue cell infrastructure rail includes:

a blue dispatcher bot, wherein each of the green and blue dispatcher bots is configured to receive the request and to generate initial data required to perform the work task associated with the request, and wherein the set of modules further comprises:

a mediation module configured to receive the work task and the initial data and configured to queue the work task in the queue.

14. The system of claim 13, wherein each of the green dispatcher bot and the blue dispatcher bot is configured to receive external data from an external data source.

15. A computer-based method, comprising:

providing N cell infrastructure rails each implemented on a respective cell infrastructure server, including a green cell infrastructure rail implemented on a green cell infrastructure server and a blue cell infrastructure rail implemented on a blue cell infrastructure server in an N-color topology in which N is greater than or equal to two;

receiving a request for a work task at a discovery server;

determining, using the discovery server, a first cell infrastructure rail of the N cell infrastructure rails to which is routed the request;
activating a dispatcher bot associated with the first cell infrastructure rail;
processing the request using the dispatcher bot;
queuing the work task in a queue; and
performing the work task using a performer bot associated with the first cell infrastructure rail.

16. The computer-based method of claim 15, wherein N equals 2.

17. The computer-based method of claim 15, wherein processing the request includes:
generating initial data required to perform the work task associated with the request using the dispatcher bot; and
dispatching the work task to a mediation module.

18. The computer-based method of claim 15, wherein determining a first cell infrastructure rail includes:
determining the case that the first cell infrastructure rail generates erroneous data;
switching the first cell infrastructure rail with a second cell infrastructure rail from among the N cell infrastructure rails; and
setting the second cell infrastructure rail as the first infrastructure rail.

19. The computer-based method of claim 15, wherein the switching includes:
receiving a state of the first cell infrastructure rail; and
responsive to the state, performing the switching.

20. The computer-based method of claim 15, wherein the switching includes:
receiving input data at a user interface; and
responsive to the input data, performing the switching.

* * * * *